US005751816A

United States Patent [19]
Howard

[11] Patent Number: 5,751,816
[45] Date of Patent: May 12, 1998

[54] AUDIO POWER AMPLIFIER DEVICE FOR MICRO-COMPUTERS

[76] Inventor: Albert R. Howard, 1010 Rockrose Ave., Sunnyvale, Calif. 94086

[21] Appl. No.: 545,159

[22] Filed: Oct. 19, 1995

[51] Int. Cl.⁶ ................................................. H04R 5/00
[52] U.S. Cl. .......................... 381/24; 381/98; 381/101; 381/109
[58] Field of Search ........................... 381/24, 98, 101, 381/109

[56] References Cited

PUBLICATIONS

Installation and operation guide, Model No. DLAX-20, Sound Minds Technology, Inc., 1994.
Users Manual and Installation Guide, Model No. PS-5000, SC&T Internatinal, Inc., 1994.
Product Data Sheet –WinRadio_fm, Sound Minds Technology, Inc. Advertisement from Computer Products, Mar. 1994, p. 182: Soundisk, Laural Technology, Inc..

*Primary Examiner*—Curtis Kuntz
*Assistant Examiner*—Duc Nguyen
*Attorney, Agent, or Firm*—Jeffrey P. Aiello; Carol D. Titus; Aiello Patent Prosecution

[57] ABSTRACT

A power amplifier device for amplifying an audio signal from sound generating circuitry in a micro-computer is provided. The device is retained in a housing secured in a drive bay of the micro-computer containing a compact disc read only memory drive. The device and disc drive may also be configured in a unitary housing. The device receives a line-level audio signal from the audio circuitry and transmits the signal to a frequency and time response contouring device, to adjust the response of the signal. A power level adjusting mechanism, such as a volume control, adjusts the power level of the signal generated by the frequency and time response device. Amplifiers are coupled to the volume control to amplify the audio signal to a level determined by the volume control. The amplification device connects to at least leftwardly and rightwardly positioned loudspeakers to provide stereophonic sound at the desired level. When the device is retained in the disc drive bay, access to the volume control and frequency response contouring device, such as a graphic equalizer or separate bass and treble controls, is substantially facile. The amplification device provides contoured and amplified audio output signals to the loudspeakers, so that the loudspeaker is capable of producing high quality stereophonic sound. A front panel of the housing may include terminals, such as line-input and mic-input, for providing a facile access location to couple remote devices to the audio circuitry, as well as a microphone for capturing audio information necessary for voice driven software.

7 Claims, 5 Drawing Sheets

5,751,816

AUDIO POWER AMPLIFIER DEVICE FOR MICRO-COMPUTERS

BACKGROUND OF THE INVENTION

1. Field of the Invention

This invention relates generally to devices adapted for use with micro-computers, and more particularly, to an improved audio power amplification device adapted for use in a micro-computer.

2. Description of Related Art

Micro-computers, such as personal computers are well known in the art. As the use of personal computers in the home and workplace continues to increase at a substantial rate, the demands on these computing devices continues to increase. Personal computers sold today process data faster and have greater data storage capability, than computers sold just a few years ago. As personal computers become more commonplace, the different uses of these computers continues to broaden.

In the past, interaction with a personal computer typically comprised data processing using a keyboard or mouse for data input and a cathode ray tube, commonly referred to as a monitor, or printer for output. However, many of the personal computers in use today embody so-called "multi-media" equipment, which is provided to enhance running programs commonly referred to as "interactive", such as video game programs, and graphical and audible oriented programs. Also, there exists a tendency to extend the use of audio input, such as using a microphone to capture voice commands and intelligence to substitute for keyboard or mouse input.

The so-called multi-media equipment typically includes, a compact disc-read only memory (CD-ROM) drive coupled to the computer's central processing unit (CPU) using well known means. A printed circuit board having audio signal generating circuitry, typically referred to as a "sound card", is coupled to the CD-ROM drive and to the CPU using known circuitry and connections. The CPU receives audio related data, processes the data, then transmits the processed data to the audio circuitry. The audio circuitry then generates a line-level audio signal, indicative of the processed data.

The computer utilizes the interaction of these multi-media components to output enhanced video information, such as so-called "full-motion" video displayed on the monitor, and audio information, such as stereophonic sound. However, the actual audio information that the user hears greatly depends upon the type and quality of the audio equipment that receives the audio signal from the audio circuitry.

Since the audio circuitry produces a line-level audio signal, it is known to couple an external loudspeaker or loudspeakers directly to this circuitry to provide enhanced listening of the audio portion of a program running on the computer. Because the signal produced by the audio circuitry is usually line-level, it is desirable to couple a power amplifier between the loudspeaker and the circuitry to increase the power level to sufficiently drive the speaker.

A known embodiment of a loudspeaker that couples to audio circuitry is provided with a low-power audio amplifier. These speakers are provided with a low wattage, from one to two watts, battery powered amplifier and have a somewhat small diameter, of approximately three inches. These loudspeakers have been produced to provide supplemental amplification for portable audio devices such as portable cassette players and radios, and the like. A disadvantage of these loudspeakers, is that since they were initially designed for use in close proximity to the listener's ear, when positioned a distance from the listener the quality of the sound produced by the speakers degrades rapidly.

There are other loudspeakers available that are more suitable for use with audio circuitry than those that embody battery powered amplifiers. However, these loudspeakers are typically cost prohibitive and usually require an external alternating current (AC) power source, such as 120 V AC, as is commonly found in the home or office. Another feature of these speakers is that the tone and volume controls are typically coupled to the speaker's enclosure. This is disadvantageous if it is desired to adjust either of the controls and the loudspeakers are out of the listener's reach. The listener would have to momentarily cease their operation of the computer, go to the location of the loudspeakers and adjust the desired control or controls, then return to the computer and resume their task.

Another known attempt to enhance the audio signal generated by programs running on the personal computer comprises positioning a device that embodies both a pair of loudspeakers and an amplifier, in a vacant 5.25 inch drive bay in the computer. One such device is manufactured by Sound Minds Technology, Inc., of Campbell, Calif. The disclosed device embodies a pair of speakers that are coupled to an amplifier. The device couples to an audio information source in the personal computer, with the amplifier of the device coupling to the internal power supply of the computer, for powering the speakers. A disadvantage of the disclosed device is, that since the speakers are retained in the device and the device is housed in the 5.25 inch drive bay, the speakers are in substantially close proximity to each other. Thus, the channel separation normally associated with stereophonic sound is almost nonexistent. Another disadvantage of the device, is that the speakers are substantially small so that they fit in the device. As can be expected, the sound quality produced by the diminutive speakers is somewhat poor.

A further attempt to provide suitable means for enhancing the audio signal generated by the audio circuitry comprises positioning a pair of loudspeakers in the main case of the computer. Various computer manufacturers have positioned a pair of loudspeakers adjacent to a front panel of the computer's case, one speaker positioned at either end of the front panel. In this embodiment, the loudspeaker's amplifier is coupled to the internal power supply of the computer. A disadvantage of this attempt, is that due to the various configurations of computer cases, the speakers may not be in suitable proximity to the listener. A further disadvantage is that while the distance between the loudspeaker provides increased stereo channel separation, the sound produced by the loudspeakers is poor due to small enclosures and inadequate acoustic conditions.

Lastly, another known attempt to enhance the audio signal output from personal computers, is to couple a well known audio power amplifier to the audio circuitry. The amplifier couples to an external AC power source, as discussed above, to the audio circuitry for increasing the power level of the audio signal from the circuitry, and to conventional high fidelity loudspeakers. However, this is substantially difficult to implement, as connecting the amplifier to the audio circuitry requires providing several interconnecting cables between the amplifier and circuitry.

There, therefore exists a need for a facile means of amplifying the audio signal power level from audio signal generating circuitry in a micro-computer, and for enhancing the quality of sound heard by a user, and which can be retained in a drive bay of the micro-computer and further to provide a convenient means to capture voice input.

OBJECTS OF THE INVENTION

It is therefore an object of the present invention to provide a means of amplifying the power level of an audio signal generated by audio signal generation circuitry in a personal computer;

It is another object of the present invention to provide a device for amplifying the power level of an audio signal generated by audio circuitry that can be retained in a drive bay of the personal computer and couples to an internal power source of the personal computer;

It is a further object of the present invention to provide a device for amplifying the power level of an audio signal generated by audio circuitry that provides means for coupling the amplified audio signal from the device to external high fidelity loudspeakers;

It is yet another object of the present invention to provide a means of amplifying the power level of an audio signal generated by audio circuitry that provides frequency response contouring of the audio signal generated by the circuitry;

It is a still further object of the present invention to provide a device for amplifying the power level of an audio signal generated by audio circuitry in a personal computer that provides a convenient means of coupling the invented amplification device to the circuitry;

It is another object of the present invention to provide a device for amplifying the power level of an audio signal generated by a audio circuitry in a personal computer that provides facile coupling of remote audio devices, such as stereophonic equipment or a remote microphone to the circuitry; and It is yet a further object of the present invention to provide a convenient means for capturing voice input.

SUMMARY OF THE INVENTION

These and other objects and advantages of the present invention are achieved by providing an audio power amplification device for amplifying and enhancing a line-level audio signal generated by a micro-computer that embodies multi-media components. The amplification device of the present invention is adapted to be retained in the micro-computer and coupled to multi-media components, such as a compact disc read only memory (CD-ROM) drive and an audio signal generating circuit board. The audio power amplifier of the present invention receives a line-level audio signal generated by the circuitry and generates an amplified audio signal indicative of the audio signal generated by the audio circuitry. The present invention generates an amplified audio signal that is sufficient to drive loudspeakers.

The amplification device of the present invention is retained in a housing configured to be secured in a drive bay, such as a 5.25 inch form factor drive bay that contains the CD-ROM drive. Alternatively, the amplification device and disc drive may be retained in a unitary housing secured in the drive bay. The housing includes a front panel, where a plurality of actuation means for operating the device and input connectors for coupling remote devices to the circuitry via the amplification device may be located.

The invented amplification device is coupled to the audio circuitry to receive the line-level audio signal therefrom and coupled to an internal power source of the micro-computer for supplying power to amplification circuitry of the device.

The amplification circuitry includes input means for receiving the line-level audio signal from the audio circuitry. The input means maintains separate left and right audio channel signals. The left and right audio channel signals are transmitted to frequency response contouring means for controlling the frequency response of the invented device. The frequency response contouring means are adjusted to control the response of a plurality of frequency bandwidths of the line-level audio signals, centered about a plurality of predetermined frequencies of the audio signal. The contouring means may comprise known means, such as a graphic equalizer or separate bass and treble controls, or may be digitally controlled from the central processing unit. Known actuation mechanisms, such as control knobs or slide actuators for example, extend through the front panel of the housing, to provide a facile location for actuating the contouring means.

A power level adjusting means is actuated to adjust the power level of a contoured audio signal generated by the frequency response means. The adjusting means may comprise an adjustable resistive device, such as a shaft driven potentiometer coupled to a control knob, for controlling the power level of the frequency contoured audio signals. Alternatively, the adjusting means may be digital control means such as digital signal processing (DSP). Further, a pair of adjusting means may be provided, for separately controlling the power level of each audio channel.

Amplification means are coupled to the adjusting mechanism for amplifying the power level of the audio signals transmitted from the adjusting mechanism. The amplification means may comprise any suitable amplifier, or combination of amplifying devices, such as an integrated circuit device, to provide an amplified audio signal for each of the left and right audio channels.

The amplification device of the present invention is adapted to connect to at least leftwardly and rightwardly positioned loudspeakers that are preferably capable of providing stereophonic sound. Each of the loudspeakers provides an audible sound level indicative of the level of the amplified audio signal provided by the amplification means and adjusted by the power level adjusting means. Since the amplification device is retained in the micro-computer, the loudspeakers may be positioned wherever the user chooses, so that the user can enjoy stereophonic sound at the desired level, when running a computer program that produces audio signals.

As the invented amplification device is retained in the disc drive bay, access to the power level adjusting means and frequency response contouring means of the amplification device is substantially facile. The device provides frequency contoured and amplified audio signals to the loudspeakers, so that the loudspeakers are capable of producing high quality stereophonic sound.

The front panel of the housing may further include auxiliary terminals, such as line-input and mic-input, for providing a facile access location to couple remote devices to the audio circuitry. The line-input connector, is secured on the front panel of the housing and couples directly to a line-output means. The line-output means couples to a line-input connector of the audio circuitry, to couple the line-input of the device to the line-input of the audio circuitry. Thus, an audio signal from a remote audio device may be directly coupled to the audio circuitry without signal amplification.

When a mic-input connector is secured to the front panel, a remote microphone can be directly coupled to the audio circuitry, to capture voice intelligence to be processed the computer. When equipped, the mic-input is coupled to a mic-output means that couples to a mic-input connector on the audio circuitry, for electronically coupling the remote microphone to the audio circuitry. Further, a microphone may be secured to the front panel and coupled to the microphone output means. The microphone is provided for voice utilization of the micro-computer, without necessitating the use of a remote microphone.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein to provide an improved amplification device that is retained in a micro-computer for amplifying an audio signal generated by sound generating circuitry in the micro-computer.

Figure 1:
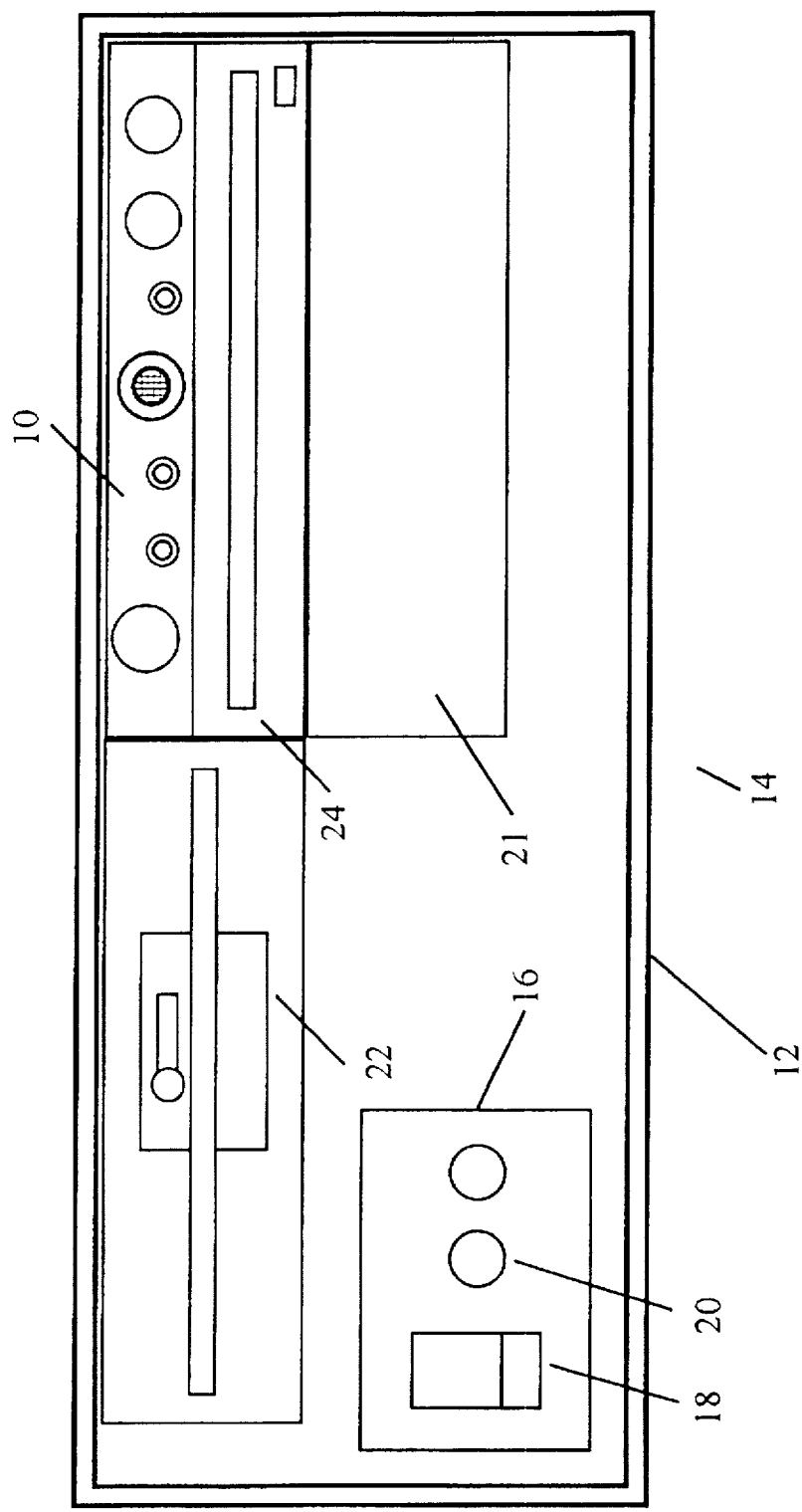
FIG. 1 is a front plan, schematic view showing a preferred embodiment of an amplification device of the present invention retained in a micro-computer.

Referring now to FIG. 1 of the drawings, there is shown generally at 10 a first embodiment of an amplifying device constructed according to the principles of the present invention. The device 10 is shown retained in a case 12 of a micro-computer 14, such as a personal computer. The case 12 is typically provided with a control panel 16 that may include an on/off switch 18 for activating and deactivating an internal power supply (shown in FIG. 2) of the computer 14 and a reset switch 20 as is well known. The computer 14 is provided with one or more 5.25 inch form factor drive bays 21 for retaining disc drives, such as a 5.25 inch floppy disc drive 22 or a compact disc read only memory (CD-ROM) drive 24, for example.

In the preferred embodiment, the invented amplification device 10 is configured to be retained in a 5.25 inch drive bay that contains the CD-ROM drive 24. It is known that CD-ROM drives are manufactured with dimensions that are substantially equal to the dimensions of a 5.25 inch form factor drive bay 21. Such dimensions are approximately 5.75 inches wide and 1.625 inches high, and any suitable depth. However, there are CD-ROM drives available, where the drive 24 occupies only approximately one inch of the height of the bay 21. The configuration of such a drive 24 enables the amplification device 10 of the present invention to be disposed in the drive bay 21 adjacent to the CD-ROM drive 24. Alternatively, the invented device 10 and CD-ROM drive 24 can be configured in a unitary housing (more thoroughly discussed hereafter) dimensioned to fit in a 5.25 inch form factor drive bay 21, typically occupied by a single CD-ROM drive.

Figure 2:
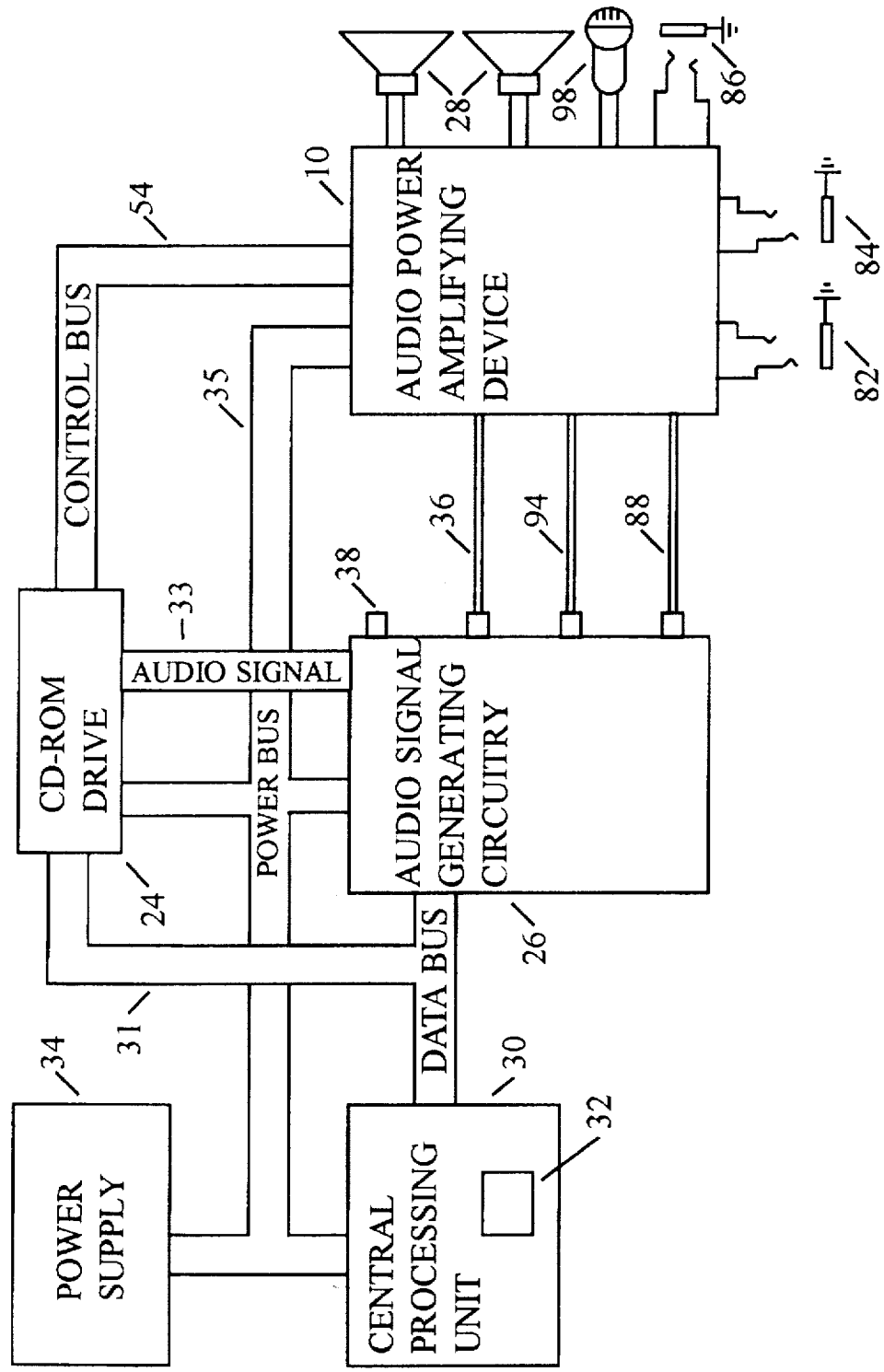
FIG. 2 is a block diagram showing connections of the preferred embodiment of the present invention coupled to multi-media components in the micro-computer and to remote equipment.

Referring now to FIG. 2 of the drawings, there is shown a block diagram illustrating interconnections between the invented amplification device 10 and so-called "multi-media" devices of the computer 14. The multi-media devices include the CD-ROM drive 24, an audio signal generating circuit board 26, and one or more external loudspeakers 28. The CD-ROM drive 24 communicates with a central processing unit (CPU) 30 of the computer 14, through a data bus 31 and communicates with the audio circuitry 26, through a line-level audio signal connection 33. A microprocessor 32 located on the CPU 30 processes the data, then transmits the processed data to the audio circuitry 26, via the data bus 31. The audio circuitry 26 then generates a line-level audio signal, indicative of the processed data.

In use, a CD-ROM disc (not shown) is placed in the drive 24, for accessing the data on the disc. As audio data on the disc is accessed, the data is transmitted from the disc to the audio circuitry 26, and processed as discussed above. The audio circuitry 26 then generates a line-level audio signal, indicative of the processed audio data.

The invented audio power amplification device 10 is coupled to the audio circuitry 26 for receiving the line-level audio signal and coupled to an internal power source 34 of the computer 14, via a power connector 35. The device 10 is connected to a suitable audio output terminal of the audio circuitry 26 that preferably provides the audio signal at a low power level. Such an output terminal is preferably a "line-out" terminal 36, however if the line-out terminal 36 is unavailable, a "speaker-out" 38, or other suitable terminal may be used. The device 10 receives the audio signal from the audio circuitry 26, then amplifies and contours the frequency response of the audio signal (more thoroughly discussed hereafter). The device 10 then transmits the amplified and contoured signal to suitable high fidelity loudspeakers 28, for providing high quality sound.

Figure 3:
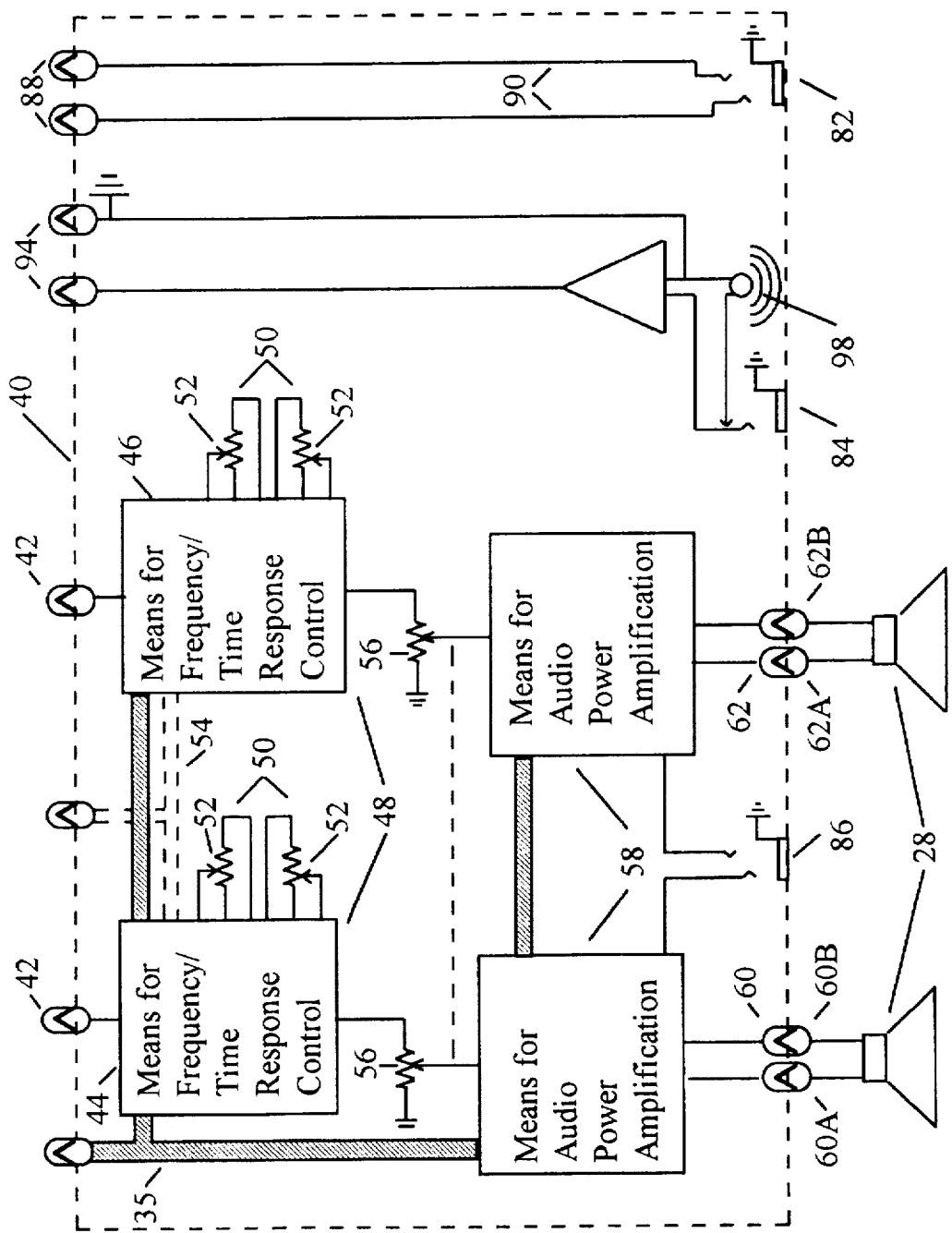
FIG. 3 is a schematic representation of amplification circuitry of the amplification device of the present invention.

Referring now to FIG. 3 of the drawings, amplification circuitry of the device 10 of the present invention is shown generally at 40. The circuitry 40 comprises input means 42 coupled to an available audio signal output terminal 36, 38 of the audio circuitry 26 for receiving the line-level audio signal. Power is supplied to the circuit 40 through the power connector 35 coupled to the power source 34 (shown in FIG. 2). The input means 42 may comprise any suitable means for coupling to the output terminal 36, 38, such as a known ⅛ inch jack (not shown), that connects the audio signal from the audio circuitry 26 into left 44 and right 46 audio channels. The left 44 and right 46 audio channels are then transmitted to frequency response contouring means 48.

The frequency response contouring means 48 are adjustable for controlling the response of a plurality of frequency bandwidths, of the line-level audio signal transmitted from the input means 42, centered about a plurality of predetermined frequencies of the signal. The contouring means 48 may comprise a series of well known resistor-capacitor (RC)

networks 50 (only the resistor portion is shown), with a variable resistive device 52, such as a shaft driven or slide actuated potentiometer. The potentiometer 52 is adjusted to control the response of a frequency bandwidth, determined by the values of the potentiometer 52 and capacitor, of the audio signal passing through the particular network 50. If the contouring means 48 comprises a well known graphic equalizer for example, each of the RC networks 50 would comprise a well known active RC network. However, if the contouring means 48 comprises separate bass and treble controls, each of the RC networks 50 would comprise a passive RC network, as is well known.

Alternatively, a digital control bus 54 (shown in phantom) may be coupled to the CPU 30 and to the amplification circuitry 40 downstream of the input means 42. The control bus 54 would enable a user of the computer 14 to control the frequency or time response of the amplification circuitry 40 through software, as opposed to manually controlling the frequency response using the contouring means 48.

Power level adjusting means 56 may be provided for controlling the power level of the left 44 and right 46 channel audio signals transmitted by the contouring means 48. The adjusting means 56 may comprise a variable resistive device, such as a shaft driven potentiometer as discussed. A pair of adjusting means 56 are shown for independently controlling the power level of each audio channel 44, 46, although a single adjusting means may be provided for simultaneously controlling the power level of both audio channels 44, 46.

Preferably, a pair of amplification means 58 are coupled to the adjusting means 56 for amplifying the power level each of the left 44 and right 46 channel audio signals transmitted from the adjusting means 56. The amplification means 58 may comprise any suitable amplifier, or operative combination of amplifiers, such as a bridge network, that will substantially amplify the power level of the left 44 and right 46 channel audio signals. Preferably, the amplification means 58 is capable of amplifying the left 44 and right 46 channels to a power level ranging from approximately 10 watts to 50 watts for each channel, depending upon the power level determined by the adjusting means 56. A suitable amplification device 58 would be an integrated circuit device such as an NEC UPD1318 AV, as manufactured by NEC Corporation of Tokyo, Japan, for example.

Each of the amplification means 58 are coupled to an output terminal 60, 62 for coupling the amplified left 44 and right 46 channel audio signals to at least leftwardly and rightwardly positioned loudspeakers 28. Each terminal 60, 62 is provided with a positive terminal 60A, 62A and a negative terminal 60B, 62B for proper stereophonic coupling of the left 44 and right 46 channel signals to the proper input terminals (not shown) of each speaker 28, to ensure that the speakers 28 are capable of providing high quality stereophonic sound. Each of the loudspeakers 28 provides sound at a level indicative of the power level of the amplified audio signal provided by the amplification means 58 and adjusted by the power level adjusting means 56.

Figure 4:
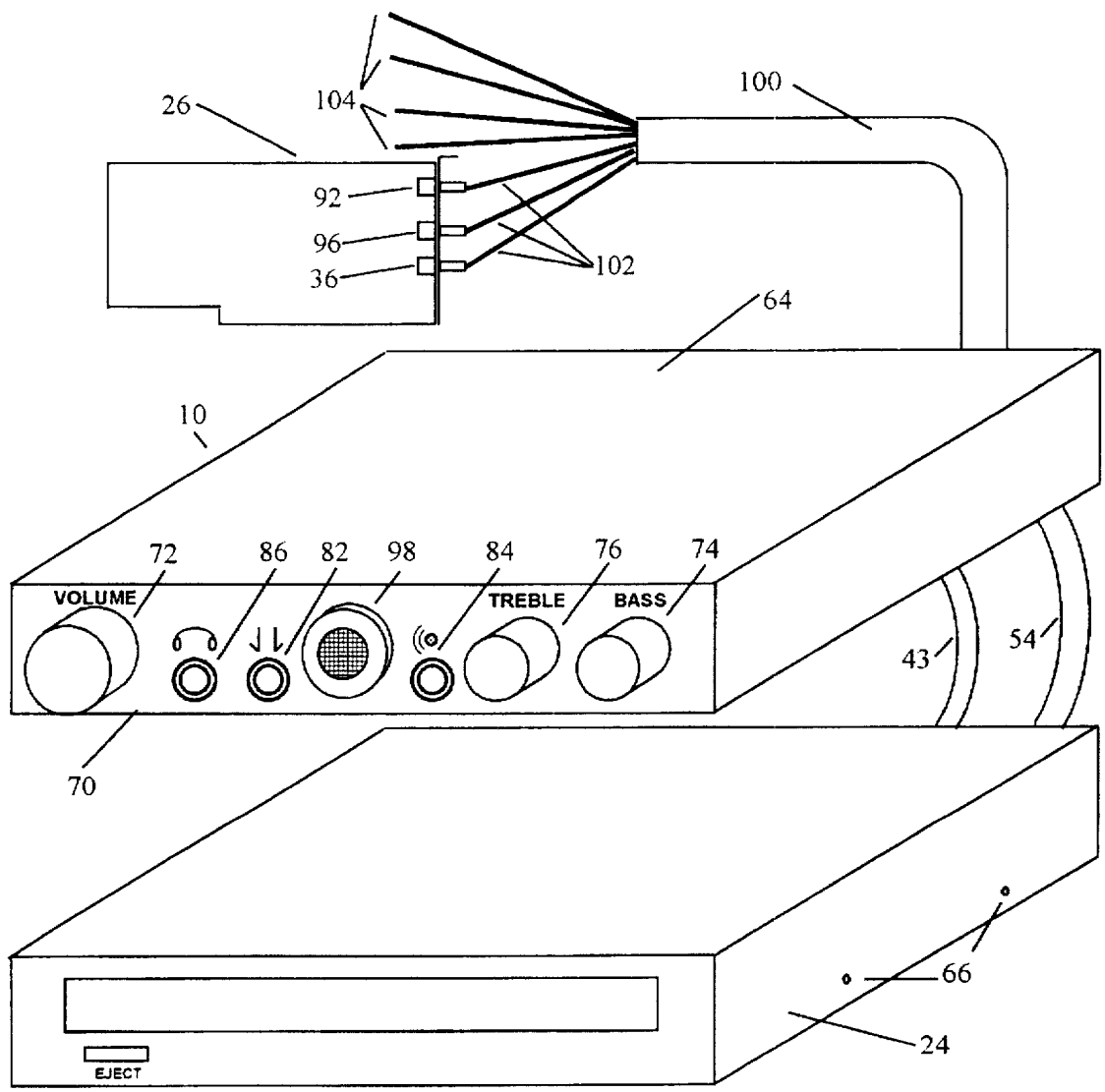
FIG. 4 is a perspective, schematic view showing the amplification device of the present invention retained in a housing.

Referring now to FIG. 4 of the drawings, there is shown a first embodiment of a housing 64 that retains the amplification circuitry 40 of the device 10 of the present invention. The housing 64 may comprise any suitable light rigid material, such as aluminum, that will not interfere with the electronic operations of the computer 14. The housing 64 is dimensioned so that the width thereof is substantially the width of the drive bay 21 for mating with CD-ROM drive 24. The housing 64 has a height H that is slightly less than the height of the drive 24, to ensure that the housing 64 and drive 24 can fit in a single 5.25 inch form factor drive bay 21 in the computer 14. The housing 64 is secured to a desired one of either the drive bay 21 or the CD-ROM drive 24, using known methods, while the drive 24 is typically provided with threaded holes 66 for receiving screws (not shown) to secure the drive 24 to the drive bay 21.

Figure 5:
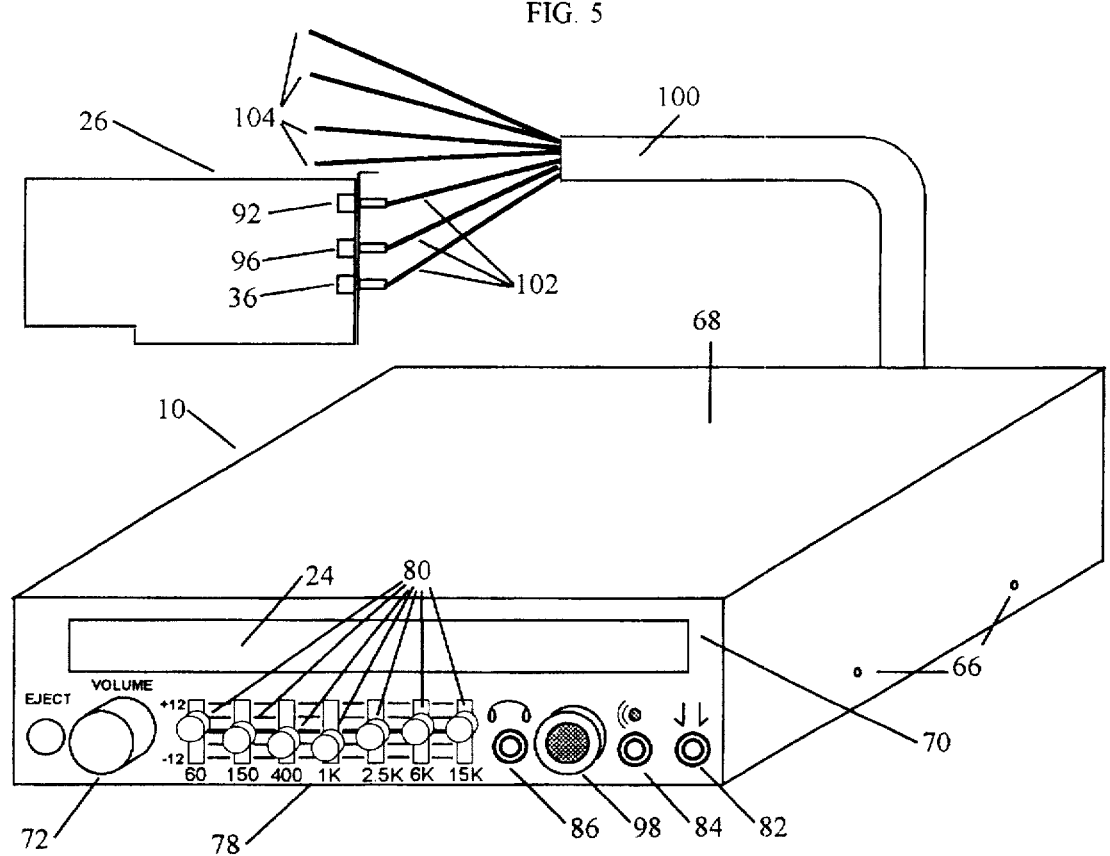
FIG. 5 is a perspective, schematic view showing the amplification device of the present invention retained in a unitary housing with a compact disc read only memory drive.

Referring to FIG. 5 of the drawings, there is shown a second embodiment of the housing 68 of the device 10 of the present invention. In the second embodiment, the housing 68 contains both the CD-ROM drive 24 and its associated circuitry, and the amplification circuitry 40 of the invented device 10. The housing 68 of the second embodiment is dimensioned to fit in a 5.25 inch form factor drive bay 21 and may be provided with threaded apertures 66 to secure the housing 68 to the drive bay.

Referring now to FIG. 4 and FIG. 5, each housing 64, 68 has a front panel 70 that provides a suitable location for facile actuation of the frequency contouring means 48 and power level adjusting means 56. Actuation of the adjusting means 56 is provided through an actuation mechanism, such as a volume control knob 72 coupled to either one or both of the adjusting means 56 using known methods. The control knob 72 is rotated in either a clockwise or counterclockwise direction to adjust the sound level output from the loudspeakers 28. Alternatively, a pair of control knobs 72 (not shown) may be provided for independently controlling the power level of each channel 44, 46.

Actuation of the frequency contouring means 48 may comprise well known separate bass 74 and treble 76 control knobs for actuation of the potentiometers of 52 of the contouring means 48, shown in FIG. 4. In this configuration, the frequency response of each of the audio channels 44, 46 is simultaneously controlled.

Alternatively, actuation of the contouring means may embody a graphic equalizer means shown generally at 78 in FIG. 5. The graphic equalizer 78 comprises a series of slide actuators 80. Each actuator 80 is used to adjust the potentiometer 52 of a particular RC network 50, to control the frequency response of the desired network 50. Each of the actuators 80 extend through the front panel 70 of the desired housing 64, 68, to provide facile actuation of the contouring means 48. Additionally, sound enhancement is possible through digitally controlling the previously discussed methods, or the utilization of digital signal processing techniques.

Referring now to FIGS. 3, 4, and 5 of the drawings, the amplification device 10 may be provided with a plurality of auxiliary terminals to provide a facile access location to couple remote devices to the audio circuitry 26. The front panel 70 of the desired housing 64, 68 may include auxiliary terminals, such as a line-input terminal 82, a mic-input terminal 84, and a headphone terminal 86. The line-input terminal 82, when provided, is secured on the front panel 70 of the housing 64, 68 and is coupled to a line-output terminal 88, using known means such as wire conductors 90. The line-output terminal 88 is adapted to couple to a line-input terminal 92 of the audio circuitry 26, to couple the line-input terminal 82 of the device 10 to the line-input terminal 92 of the audio circuitry 26. The input terminals 82, 84, of the invented device 10 provide a facile access location for coupling remote audio devices, such as stereophonic equipment, to the audio circuitry 26. The output terminal 86 is provided for the use of headphones, when desired. The input terminals 82, 84 and output terminal 86 of the device 10 comprise well known ⅛ inch audio connectors.

The mic-input terminal 84 is secured to either housing's front panel 70 and coupled to a suitable mic-output terminal 94. The output terminal 94 couples to a mic-input terminal 96 of the audio circuitry 26, to enable coupling of a remote microphone (not shown) to the audio circuitry 26. Additionally, a microphone 98 may be secured to the front panel 70 and coupled to the microphone output terminal 94. Either the provided microphone 98 or a remote microphone may be used for audio activation of selected programs on the computer, such as voice recognition, electronic voice mail, and the like. The various input terminals located 82, 84, 86, and microphone 98 provide a facile location for coupling their respective devices or functions to the audio circuitry 26. The user of the computer 14 no longer has to locate a back panel (not shown) of the computer 14 to couple or detach the devices from the audio circuitry input terminals 92, 96 or output terminals 36, 38.

A cable 100 that contains a plurality of wire conductors 102 may be provided. The wire conductors 102 are provided coupling the output terminals, such as the line-output terminal 88 and mic-output terminal 94, of the amplification circuitry 40 to the respective input terminals 92, 96 of the audio circuitry 26, and for coupling the line-out 36 or speaker-out 38 terminals of the audio circuitry 26 to the input means 42 of the invented device 10. Additionally, wire conductors 104 may be provided in the cable 100 for coupling the amplification means 58 to the loudspeakers 28.

Thus, there has been described an improved audio power amplifier device for amplifying the audio output level from audio circuitry in a micro-computer, such as a personal computer. The invented amplification device is retained in the personal computer and provides an amplified output signal to external loudspeakers. The invented device couples to the internal power source of the personal computer, so that an external power source, such as a battery, is not necessary. The amplification device may include frequency response contouring means, such as a graphic equalizer, for contouring the output signal from the device of the present invention. Further, the invented amplification device provides convenient coupling of external devices to the audio circuitry and a microphone for voice utilization of the micro-computer, without necessitating the use of a remote microphone.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. In a micro-computer that includes a central processing unit, a compact disc read only memory drive coupled to the central processing unit, audio signal generating circuitry coupled to the central processing unit, the audio circuitry adapted to provide a line-level audio signal, and an internal power source providing power to the central processing unit, the compact disc drive, and the audio circuitry, an amplification device for amplifying the audio signal from the audio circuitry comprising:

a unitary housing retaining an audio signal power amplification device and said compact disc drive, said housing adapted to be retained in a 5.25 inch drive bay of said micro-computer, said amplification device comprising;

first and second input means coupled to said audio circuitry for receiving the line-level audio signal therefrom, frequency response contouring means is coupled to said input means for adjusting the frequency response of said line-level audio signal, said contouring means controlling the response of a plurality of frequency bandwidths of said line-level audio signal centered about a plurality of predetermined frequencies of said audio signal passing through said contouring means, power level adjusting means coupled to said frequency response contouring means for adjusting the power level of a frequency contoured audio signal generated by said frequency response contouring means, and at least one amplification means coupled to said adjusting means for amplifying the power level of an adjusted audio signal from said adjusting means to provide an amplified audio signal;

audio output means for coupling said amplified audio signal to a plurality of loudspeakers, each of said loudspeakers providing an audible sound level indicative of the level of the amplified audio signal provided by said amplification means and adjusted by said adjusting means;

connecting means for connecting said amplification device to said compact disc drive, said connecting means coupling said amplification device to said power source;

line-input means secured on a front panel of said housing and a line-output means coupled to said line-input means, said line-input and output means providing a facile access location for coupling a remote audio device to said audio circuitry; and a microphone input on a front panel of said housing and a microphone output coupled to said input, said microphone output coupling to a microphone input of said audio circuitry for providing a facile access location for coupling a remote microphone to said audio circuitry; and a microphone secured to said front panel and coupled to said microphone output, said microphone provided for capturing audio information necessary for voice driven software running on said computer.

2. The amplification device of claim 1 wherein said frequency response contouring means further comprises a series of resistor-capacitor networks for adjusting the frequency response of said line-level audio signal, each of said resistor-capacitor networks including an adjustable resistive device for controlling the response of a frequency bandwidth centered about a predetermined frequency passing through each of said networks.

3. The amplification device of claim 1 wherein said frequency response contouring means is coupled to said central processing unit for receiving digital information therefrom to determine the desired frequency response output of line-level audio signals passing through said contouring means.

4. The amplification device of claim 1 wherein a plurality of actuation means for adjusting said frequency response contouring means and for adjusting said power level adjusting means are secured to the front panel of said housing for providing a facile access location for adjusting said frequency response contouring means and said power level adjusting means.

5. The amplification device of claim 1 further comprising a microphone input on the front panel of said housing and coupled to said microphone output, said microphone output coupling to a microphone input of said audio circuitry for providing a facile access location for coupling a remote microphone to said audio circuitry.

6. The amplification device of claim 1 wherein said input means further includes means for maintaining separate left channel and right channel audio signals transmitted by said audio circuitry for feeding said left and right channel audio signals to said frequency response means, said frequency response means contouring each of said signals for providing said adjusting means with left and right channel contoured audio signals, said adjusting means actuated to provide said amplifier means with a power level adjusted audio signal for each of said left and right channels, said amplifier means providing amplified left and right audio signals to said output means for coupling each of said left and right channel amplified audio signals to at least a leftwardly and rightwardly positioned loudspeaker to provide stereophonic sound indicative of the audio signal transmitted by said audio circuitry.

7. In a micro-computer that includes a central processing unit, a compact disc read only memory drive coupled to the central processing unit, audio signal generating circuitry coupled to the central processing unit, the audio circuitry adapted to provide a line-level audio signal, and an internal power source providing power to the central processing unit, the compact disc drive, and the audio circuitry, an amplification device for amplifying the audio signal from the audio circuitry comprising:

- a unitary housing for retaining said amplification device and said compact disc drive, said audio signal amplification device and said compact disc drive made integral in said unitary housing, said housing adapted to be retained in a 5.25 inch form factor drive bay of said computer;

said amplification device comprising;

- an input connector adapted to be coupled to an audio signal output of said audio circuitry for providing the line-level audio signal to said amplification device, said input connector including means for maintaining separate audio signals transmitted by said audio circuitry into a left channel audio signal and a right channel audio signal,
- frequency response contouring mechanisms coupled to said input connector for independently adjusting the frequency response of each of said left and right channel audio signals,
- a power level adjusting mechanism coupled to said frequency response contouring mechanisms, said adjusting mechanism comprising an adjustable resistive device for controlling the power level of a frequency contoured audio signal generated by said frequency response contouring mechanisms and passing through said adjusting mechanism, and
- left and right amplification means coupled to said adjusting mechanism for amplifying the power level of left and right channel audio signals transmitted by said adjusting mechanism for transmitting left and right channel amplified audio signals;
- a line-input connector secured on a front panel of said housing and a line-output means coupled to said line-input connector, said line-output means coupled to a line-input connector of said audio circuitry, the line-input connector secured on said front panel providing a facile access location for coupling a remote audio device to said audio circuitry;
- a microphone input connector secured on the front panel of said housing and a microphone output means coupled to said input connector, said microphone output means coupled to a microphone input connector of said audio circuitry, said input connector secured on said front panel providing a facile access location for coupling a remote microphone to said audio circuitry, and a microphone secured to said front panel and coupled to said microphone output means, said microphone provided for capturing audio information necessary for voice driven software running on said computer;
- connecting means for connecting said amplification device to said compact disc drive for coupling said device to said internal power source; and
- audio output means coupling the left and right channel amplified audio signals from said amplification means to at least leftwardly and rightwardly positioned loudspeakers, said loudspeakers providing audible stereophonic sound at a level proportional to the level of the amplified audio signal provided by said amplification means and adjusted by said adjusting mechanism.

* * * * *